US008180780B2

(12) United States Patent
Herness et al.

(10) Patent No.: US 8,180,780 B2
(45) Date of Patent: May 15, 2012

(54) COLLABORATIVE PROGRAM DEVELOPMENT METHOD AND SYSTEM

(75) Inventors: Eric Nels Herness, Byron, MN (US); William T. Newport, Rochester, MN (US); John Joseph Stecher, Rochester, MN (US); Robert E. Wisniewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 11/951,434

(22) Filed: Dec. 6, 2007

(65) Prior Publication Data

US 2009/0150344 A1    Jun. 11, 2009

(51) Int. Cl.
*G06F 17/30* (2006.01)
(52) U.S. Cl. ........ 707/748; 707/713; 707/718; 707/723; 707/769
(58) Field of Classification Search ............... 707/713, 707/718, 723, 748, 769
See application file for complete search history.

(56) References Cited

U.S. PATENT DOCUMENTS

| | | | | |
|---|---|---|---|---|
| 5,355,474 | A * | 10/1994 | Thuraisngham et al. | 707/9 |
| 5,855,015 | A * | 12/1998 | Shoham | 715/205 |
| 6,931,399 | B2 * | 8/2005 | Cheng et al. | 707/769 |
| 6,977,679 | B2 * | 12/2005 | Tretter et al. | 348/231.2 |
| 7,072,888 | B1 * | 7/2006 | Perkins | 707/733 |
| 7,181,727 | B1 * | 2/2007 | Bachmat et al. | 717/124 |
| 7,451,079 | B2 * | 11/2008 | Oudeyer | 704/264 |
| 7,565,630 | B1 * | 7/2009 | Kamvar et al. | 707/3 |
| 7,756,887 | B1 * | 7/2010 | Haveliwala | 707/769 |
| 7,827,125 | B1 * | 11/2010 | Rennison | 706/14 |
| 2006/0085213 | A1 * | 4/2006 | Weigt et al. | 705/1 |
| 2007/0021998 | A1 * | 1/2007 | Laithwaite et al. | 705/9 |
| 2007/0036398 | A1 * | 2/2007 | Chen | 382/118 |
| 2007/0106659 | A1 * | 5/2007 | Lu et al. | 707/5 |
| 2007/0282670 | A1 * | 12/2007 | Repasi et al. | 705/10 |
| 2008/0267504 | A1 * | 10/2008 | Schloter et al. | 382/181 |

OTHER PUBLICATIONS

NetBeans IDE 5.5.1. Datasheet [online]. Sun Microsystems, 2000 [retrieved on Nov. 29, 2007]. Retrieved from the Internet: <URL: collab.netbeans.org/>.
Visual Studio 2005 Team Foundation Server Power Tools. Datasheet [online]. Microsoft, 2005 [retrieved on Nov. 29, 2007]. Retrieved from the Internet: <URL: msdn2.microsoft.com/en-us/teamsystem/aa718351(d=printer).aspx>.

(Continued)

*Primary Examiner* — Shahid Alam
*Assistant Examiner* — Andalib Lodhi
(74) *Attorney, Agent, or Firm* — Toler Law Group

(57) ABSTRACT

A method, apparatus and program product facilitate the collaborative development of an algorithm by, in part, displaying an algorithm associated with a performance attribute, and receiving user input relating to the algorithm from a plurality of networked users. The performance attribute of the algorithm may be automatically modified based on the user input. The modified performance attribute may be displayed to the plurality of networked users. A query may be received from a user interested in the algorithm. In response to the user query, the algorithm may be located from among a plurality of algorithms. For instance, the algorithm may be located from among the plurality of algorithms by matching the performance attribute to a criterion of the user query. Alternatively or additionally, the algorithm may be located by matching the performance attribute to a profile of the user submitting the user query. Also in response to the user query, a second algorithm and/or performance attribute related to the algorithm, or another, may be displayed.

20 Claims, 3 Drawing Sheets

OTHER PUBLICATIONS

PhpDesigner 2008. Datasheet [online]. MPSoftware, 1998 [retrieved on Nov. 29, 2007]. Retrieved from the Internet: <URL: www.mpsoftware.dk/phpdesigner_screenshots.php>.

GForge Helps You Manage the Entire Development Life Cycle. Datasheet [online]. GForge Group, 2007 [retrieved on Nov. 29, 2007]. Retrieved from the Internet: <URL: gforge.org>.

* cited by examiner

COLLABORATIVE PROGRAM DEVELOPMENT METHOD AND SYSTEM

FIELD OF THE INVENTION

The present invention generally relates to computers and computer programming, and more particularly, to systems and processes for developing new program code.

BACKGROUND OF THE INVENTION

An integrated development environment (IDE) is a software program that aids computer programmers in developing software. IDE's are also known by "integrated design environments" and "integrated debugging environments." IDE's typically consist of a source code editor, a compiler, an interpreter, build-automation tools and a debugger. Additionally, an IDE may include a version control system, various tools to simplify the construction of a graphical user interface ("GUI"), a class browser, an object inspector, and/or a class hierarchy diagram. An IDE is typically devoted to a specific programming language.

An algorithm is any software code that performs a specified function or provides a specific problem-solving procedure. By combining algorithms, software developers can build software programs. Algorithms can often be used in multiple programs for multiple purposes. Typically, the applicability of an algorithm can be increased significantly by revising the algorithm, itself. Thus, where an algorithm has already been developed and is available, significant programming effort can be saved by modifying the available algorithm, rather than designing it anew.

Software development has become extremely sophisticated, complicated, and time-consuming as the demands on and sophistication of software programs have correspondingly increased. Commercial software is now typically developed in a collaborative environment where subsets of a large program are parceled out to different developers. Different parts of a large program can be assigned to a developer with the appropriate expertise. Developers often seek out and avail themselves of the personal and written expertise of other experienced developers who are not always assigned to the software development project at issue.

The collaborative software design process typically involves the use, or the modification and then use, of already developed and available algorithms. In order to effectively use these available algorithms, software developers must be able to efficiently locate available algorithms for ones that are suitable for their needs, evaluate the suitability of those algorithms, and determine what modifications to the algorithms are necessary to integrate the algorithm into the software program being developed. In evaluating the efficacy of a given algorithm, software developers are performing a task often already performed by another developer: determining whether a given algorithm is suitable for a given application or requirement.

IDE users are relegated to searching outside of their respective IDE's to locate and evaluate the effectiveness of an existing algorithm. In this sense, IDE's are static and do not facilitate a collaborative environment. As a result, many software developers develop software code and algorithms that already exist. The same software code or algorithms are developed repeatedly and the same software errors, or bugs, are often written into the software and later edited out. This practice leads to duplicative and wasted effort, as well as to lower quality software products.

For at least these reasons, there exists a need for an improved IDE, allowing software developers to search for existing, available algorithms and benefit from feedback provided by other software developers regarding the selected algorithm.

SUMMARY OF THE INVENTION

The present invention provides an improved computer implemented method, apparatus and program product for facilitating the collaborative development of an algorithm by, in part, displaying an algorithm associated with a performance attribute. Embodiments may receive user input relating to the algorithm, and by association, the performance attribute from a plurality of networked users. The performance attribute of the algorithm may be automatically modified based on the user input. The modified performance attribute may be displayed to the plurality of networked users.

Aspects of the invention may receive a query from a user interested in the algorithm. In response to the user query, the algorithm may be located from among a plurality of algorithms. For instance, the algorithm may be located from among the plurality of algorithms by matching the performance attribute to a criterion of the user query. Alternatively or additionally, the algorithm may be located from among the plurality of algorithms by matching the performance attribute to a profile of the user submitting the user query. Also in response to the user query, a second algorithm and/or performance attribute related to the algorithm or another may be displayed.

Embodiments consistent with the invention may store the performance attribute in association with the algorithm. The modification of the performance attribute may be accomplished automatically and by integrating the user input. As such, exemplary performance attributes may include a rating, a category, program language and text, among others. The modified performance attribute may be displayed in relation to another performance attribute according to the result of a comparison between the performance attributes.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

The present invention provides an addition, enhancement, and/or compliment to the traditional IDE that allows developers to automatically search for and locate algorithms stored in a software repository, review the performance attributes of the algorithm and retrieve the algorithm for use, and, if desired, provide feedback concerning the quality and efficacy of the algorithm. The feedback may be used to modify performance attributes, such as a rating, that gauge the efficacy of the algorithm.

The invention contemplates a software repository, typically a database, where algorithms may be stored. The repository may store not just the individual algorithms, but also performance attributes related to each algorithm. In some embodiments consistent with the invention, the performance attributes may measure or relate to the overall efficacy of each algorithm. Thus, the repository may allow the algorithm to be associated with performance attribute(s) that are used to categorize the algorithm and measure its overall efficacy for a given application or situation, or as decided by a specific user.

Aspects of the invention may integrate a search capability into a traditional IDE, allowing the user to automatically search for algorithms fitting the search criteria. Features of the invention may then allow the user to view the algorithm, along with the performance attributes, which may be descriptive of the efficacy of the algorithm, and/or the algorithm, itself. If then desired, the user may be able to retrieve the algorithm and test it in the IDE environment, including inserting the algorithm into the software programs the user is working on.

The invention may also allow the user to provide feedback regarding the efficacy of a given algorithm. The providing of this feedback may modify the performance attributes related to the efficacy of the algorithm. The feedback provided by the user may, in the case of quantitative performance attributes, be weighted equally with other users such that an average rating regarding efficacy could be generated.

Aspects of the invention may facilitate the continual or repetitive process of users locating algorithms that fit their programming needs. Users may be empowered to evaluate whether those algorithms are suitable for their programming needs, and then receive feedback regarding the efficacy of the algorithms. The feedback provided by users may ultimately be what other users use to evaluate the efficacy of a given algorithm, both overall and for their specific application.

Figure 1:
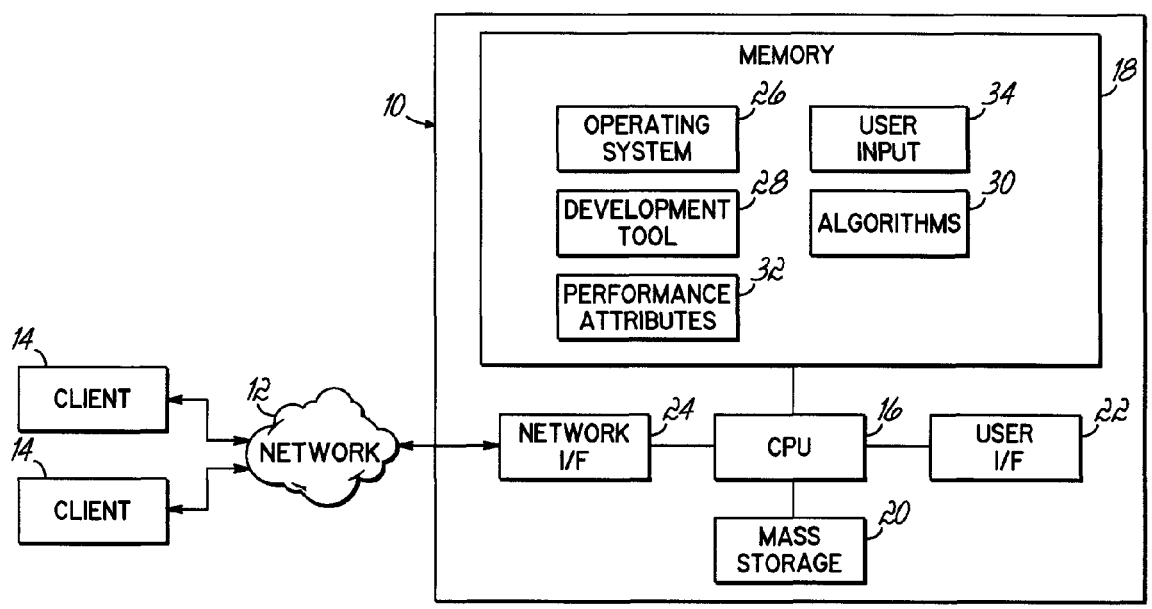
FIG. 1 shows a block diagram of a computer system configured to facilitate the development of an algorithm in accordance with the principles of the present invention.

Turning now to the Drawings, wherein like numbers denote like parts throughout the several views, FIG. 1 illustrates an exemplary apparatus, or a computer system 10, within which an algorithm may be collaboratively developed in accordance with the underlying principles of the present invention. The computer system 10 in the illustrated embodiment is implemented as a server or multi-user computer system that is coupled via a network 12 to one or more client computers 14. For the purposes of the illustrated embodiment, each computer 10, 14 may represent practically any type of computer, computer system or other programmable electronic device. Moreover, each computer 10, 14 may be implemented using one or more networked computers, e.g., in a cluster or other distributed computing system. In the alternative, program development applications consistent with the invention may be implemented within a single computer or other programmable electronic device, such as a desktop computer, a laptop computer, a handheld computer, a cell phone, a set top box, a non-networked, standalone configuration, etc.

The computer 10 typically comprises a central processing unit 16 that includes at least one microprocessor coupled to a memory 18. Memory 18 may represent the random access memory (RAM) devices comprising the main storage of the computer 10, as well as any supplemental levels of memory: cache memories, non-volatile or backup memories (programmable or flash memories), read-only memories, etc. In addition, memory 18 may be considered to include memory storage physically located elsewhere in the computer 10, e.g., any cache memory in a processor in CPU 16, as well as any storage capacity used as a virtual memory, as stored on a mass storage device 20 or on another computer coupled to the computer 10.

The computer 10 also typically receives a number of inputs and outputs for communicating information externally. For interface with a user or operator, the computer 10 typically includes a user interface 22 incorporating one or more user input devices (e.g., a keyboard, a mouse, a trackball, a joystick, a touchpad, and/or a microphone, etc.) and a display (e.g., a CRT monitor, an LCD display panel, and/or a speaker, etc.). Otherwise, user input may be received via another computer or terminal.

For additional storage, the computer 10 may also include one or more mass storage devices 20, such as a floppy or other removable disk drive, a hard disk drive, a direct access storage device (DASD), an optical drive (a CD drive, a DVD drive, etc.), and/or a tape drive, among others. Furthermore, the computer 10 may include a network interface 24 with one or more networks 12 (e.g., a LAN, a WAN, a wireless network, and/or the Internet, and so on) to permit the communication of information with other computers and electronic devices. It should be appreciated that the computer 10 typically includes suitable analog and/or digital interfaces between CPU 16 and each of components 18, 20, 22 and 24 as is well known in the art. Other hardware environments are contemplated within the context of the invention.

The computer system 10 operates under the control of an operating system 26 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to the computer system 10 via network 12, e.g., in a distributed or client-server computing environment, whereby the processing required to implement the functions of a computer program may be allocated to multiple computers over a network.

As shown in FIG. 1, the memory 18 also includes an algorithm development tool 28 for coordinating and integrating user input 34 in order to modifying performance attributes 32 associated with originally submitted algorithms 30. In some embodiments, performance attributes 32 are descriptive of the performance of an algorithm, and may take the form of text, ratings, highlights, categorizations and other metadata. In some embodiments, performance attributes may comprise a modified algorithm, itself. In one sense, a modified algorithm may be an algorithm regarding which user input/feedback has been received, regardless of whether the functional program language of the algorithm has been altered by the feedback.

As such, the memory 18 may function as a software repository, or database, allowing both algorithms and associated performance attributes to be stored. The database may be hosted on a computer server and implemented via a middleware based server that would transmit user input 34 to the memory 18 for storage. The information submitted to the memory by the algorithm's author and submitter may be supplemented by those utilizing the computer system 10 to locate and utilize available algorithms 30 and associated performance attributes 32.

In general, the routines executed to implement the embodiments of the invention, whether implemented as part of an operating system or a specific application, component, program, object, module or sequence of instructions, or even a subset thereof, will be referred to herein as "algorithms," "program code," or simply "programs." Program code typically comprises one or more instructions that are resident at various times in various memory and storage devices in a computer; when read and executed by one or more processors in a computer they cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media comprise, but are not limited to tangible, recordable type media and transmission type media. Examples of tangible, recordable type media include volatile and non-volatile memory devices, floppy and other removable disks, hard disk drives, magnetic tape, and optical disks (CD-ROMs, DVDs, etc.). Examples of transmission type media include digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature.

Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Embodiments consistent with the underlying principles of the present invention may allow software developers to provide feedback on algorithms they have worked with, as well as to modify performance attributes associated with the algorithm. In this manner, improvements, suggestions and guidance and other feedback/user input 34 associated with the algorithm may be made available to other users.

Figures 2, 3, 4:
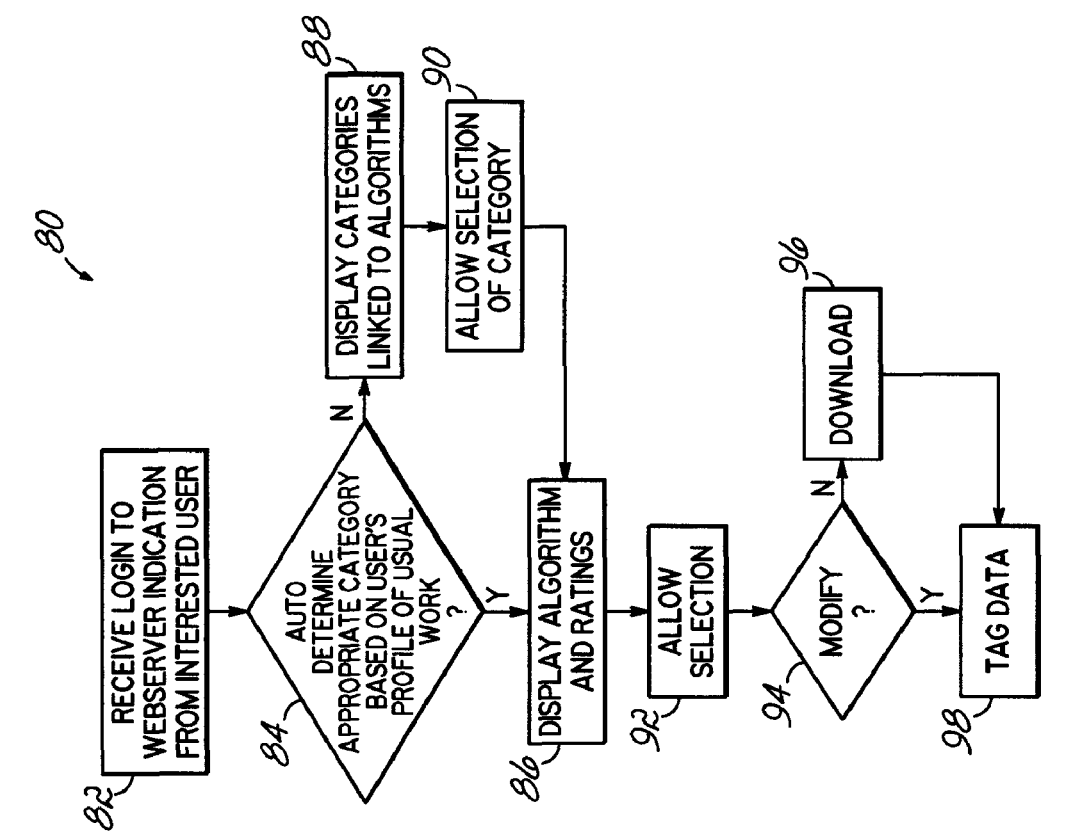
FIG. 2 shows a flowchart having steps executable by the system of FIG. 1 for initiating a user search, returning a list of algorithms matching the search criteria, and allowing the user to both view and modify the performance attributes of a selected algorithm.
FIG. 3 shows a flowchart having steps executable by the system of FIG. 1 and expanding upon the processes of FIG. 2 for submitting an algorithm and initial performance attributes into the system repository.
FIG. 4 shows a flowchart having steps executable by the system of FIG. 1 and expanding upon the processes of FIG. 2 for receiving a query from a user, returning algorithms matching the query criteria, enabling the user to view or retrieve the algorithm, and enabling the user to post feedback regarding the algorithm by altering the performance attributes.

FIG. 2 is a flowchart 50 having steps executable by the computer system 10 of FIG. 1 and detailing the overall operation of an embodiment of the invention. The steps of the flowchart 50 show a continual process whereby users may find, review and provide feedback regarding available algorithms. The feedback provided may modify the performance attributes of a given algorithm, thereby affecting the information regarding the available algorithms to future users of the same or a related process.

Turning more particularly to the steps of the flowchart 50, block 52 shows a threshold step whereby a software developer submits and the computer system 10 receives a new algorithm 30 within the memory 18.

Block 54 shows an exemplary first step in what may be a repeated, continual process with regard to each original algorithm 30 and associated performance attribute 32. The computer system 10 may allow a querying user to search for algorithms 30 meeting the querying user's needs. The search criteria may be matched to the performance attributes of the available algorithms. In some embodiments, the search criteria may be drawn from the user's query and/or a work profile associated with the querying user. For instance, a user logging onto the computer system 10 may have a profile indicating that they work in a specific field. By logging on, the user may effectively invite the computer system 10 to locate any algorithms, comments, postings or other performance attributes related to the field of the user.

At block 56, the computer system 10 may match the search criteria of the query to those algorithms 30 having performance attributes 32 matching the criteria.

Block 58 shows the next step in the process whereby the algorithm and the associated performance attributes may be displayed to the querying user. The user may be able to review not only the content of the algorithms returned, but also any comments, suggested modifications, ratings and other performance attributes 32.

At block 60, the querying user may be prompted for input regarding the performance attributes 32 of the original algorithm 30. The querying user may be prompted for this information via a dialog or input box with preset fields soliciting and defining the information sought from the querying user. The performance attributes 32 relating to efficacy of a given algorithm may hereinafter be referred to as efficiency attributes.

Block 62 shows the computer system 10 actually receiving the user input 34 solicited from the querying user in block 60.

Block 64 shows the user input 34 received at block 62 being associated with the original algorithm 30. For certain efficiency attributes, this process may include modifying the efficiency attribute either via calculation in the case of a rating, or through supplementation, in the case of comments or other non-quantitative feedback. Other user input 34 may result in the suggested modification of a portion of the algorithm, thereby generating a new performance attribute 32.

FIG. 3 shows a flowchart 70 having steps executable by the computer system 10 of FIG. 1 and expanding upon the processes of FIG. 2 for submitting an algorithm and initial performance attributes into the memory 18. In a sense, the steps of the flowchart 70 more particularly expand upon the processes of block 52 of FIG. 2.

Turning more specifically to the flowchart 70, block 72 shows the actual content or software code of the algorithm, itself, being submitted and received into memory 18 by the system 10. Block 74 shows submission to the memory 18 of metadata related to the submitted algorithm. The metadata may comprise performance attributes 32 of the received algorithm 30. For instance, the submitting user may offer metadata categorizing the algorithm 30 based on its purpose, function and other criteria defined by the submitting user's development community. These performance attributes 32 relating to purpose, function, and other criteria may hereinafter be referred to as categorization attributes. Embodiments consistent with the invention may allow, but not require, the user to submit feedback regarding the efficacy of the submitted algorithm, thus initially populating the performance attributes regarding efficacy of the algorithm.

Block 76 of FIG. 3 shows that the user may highlight, tag, or set off portions of the algorithm that the submitting user believes are significant, efficient, of above-average quality, or otherwise noteworthy. The highlighted, tagged, or set off portions of the algorithm may additionally comprise performance attributes 32 associated with the originally submitted algorithm 30.

At block 78, the computer system 10 may push and record within the memory 18 the algorithm 30 and performance attributes 32 provided by the submitting user. Upon the completion of the steps in block 78, the submitting user may receive at block 80 a confirmation that the algorithm 30 and performance attributes 32 have been recorded in the database. This confirmation may include a summary of the information submitted by the submitting user.

FIG. 4 shows a flowchart 80 having steps executable by the computer system 10 of FIG. 1 and expanding upon the processes of FIG. 2 for receiving a query from a user, returning algorithms matching the query criteria, enabling the user to view or retrieve the algorithm, and enabling the user to post feedback regarding the original algorithm 30 by altering the performance attributes 32. FIG. 4 may more particularly expand upon the processes of block 54 of FIG. 2.

Turning more specifically to block 82 of FIG. 4, the computer system 10 may query the querying user for login information. Among other benefits, this step at block 82 may allow for secured access to the system, as well as the association of the querying user's identity with the feedback provided.

Block 84 shows the computer system 10 soliciting input from the querying user. The user may indicate whether or not the computer system 10 should automatically determine what algorithms 30/performance attributes 32 to provide to the querying user based on the querying user's profile of typical work. The query's user's profile of typical work may be associated with the querying user based on the identification established in block 82. If the querying user chooses to have the algorithms 30/performance attributes 32 provided based on their profile of typical work, the computer system 10 may proceed to block 86. If the querying user declines to have the algorithms provided based on the profile of typical work, the computer system 10 may alternatively proceed to block 88.

More specifically, the computer system 10 at block 86 may display the algorithms 30 and/or performance attributes 32 determined to meet the querying user's needs. The algorithms 30 and relevant performance attributes 32 may be displayed in a dialog box or other feedback mechanism.

At block 88 of FIG. 4, the computer system 10 may display to the user the categories that algorithms can be associated with, and/or other categorization attributes being displayed to the querying user.

Block 90 shows that the querying user may select the categories or categorization attributes displayed in block 88, and thereby search for or select algorithms 30 that match the criteria. The algorithms 30 and/or performance attributes 32 meeting the criteria may be displayed to the user at block 86.

Block 92 shows that the querying user may view a summary of the information returned with the ability to see more detailed information for selected algorithms 30, or parts of algorithms 30. The querying user may also be able to view the original algorithm 30, itself.

Block 94 shows that the querying user may choose to provide feedback relating to a selected, original algorithm 30 or performance attribute 32. If the querying user declines to modify the selected, original algorithm 30 or associated performance attribute 32, the computer system 10 may proceed to block 96. If the querying user decides to modify the selected algorithm 30 or performance attribute 32, the computer system 10 may proceed to block 98.

Block 98 shows actual modification of the performance attributes 32 associated with the original algorithm 30. This may include, but is not limited too, modifying the efficiency attributes by providing quantitative feedback, highlighting or tagging parts of the algorithm, or providing comments. Other user input 34 may be used to modify aspects of the algorithm, itself. This information may be submitted to and recorded in the database, or memory 18. The computer system 10 may then proceed to block 96.

Block 96 shows that the querying user may, after review of the selected, original algorithm 30 and performance attributes 32, download the selected algorithm (or modified algorithm comprising a performance attribute 32) for use, testing, or evaluation.

Figure 5:
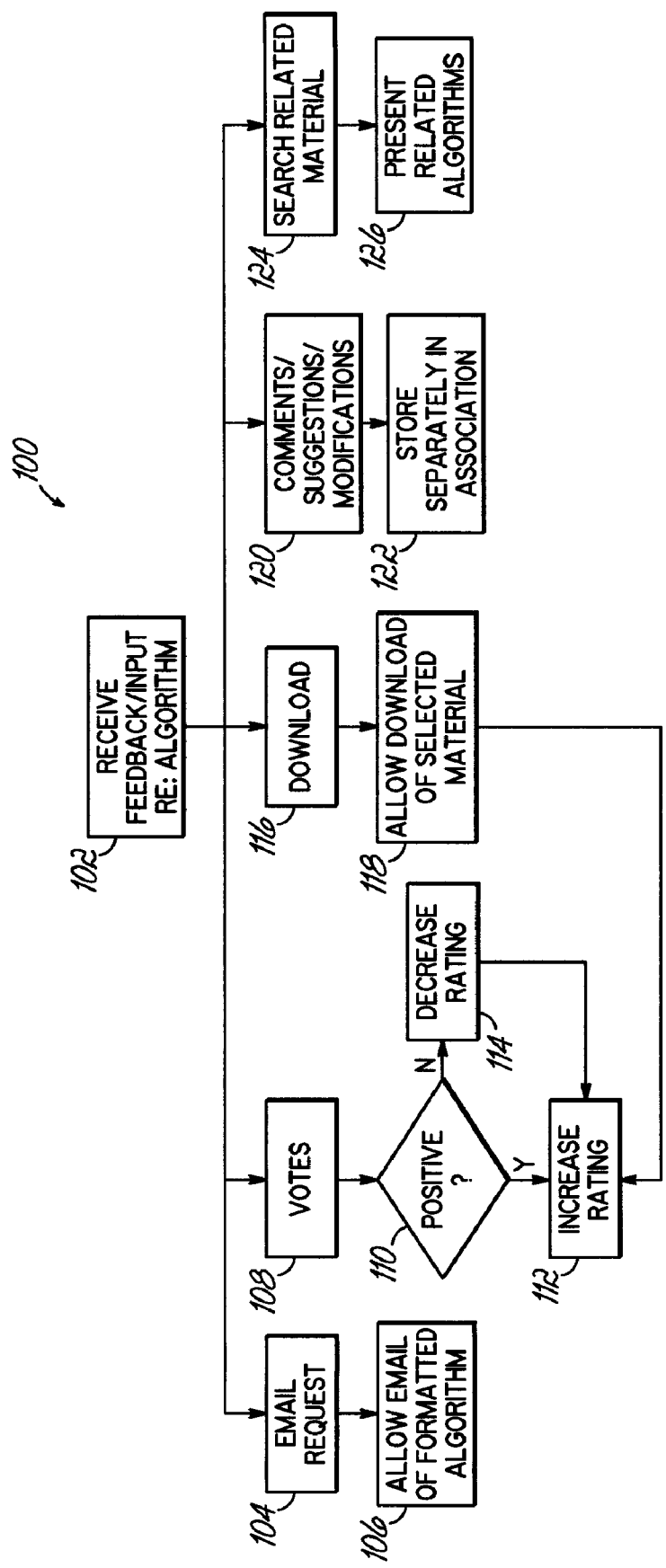
FIG. 5 shows a flowchart having steps executable by the system of FIG. 1 and expanding upon the processes of FIG. 2 for allowing the performance attributes of a specific algorithm to be modified by a reviewing user.

FIG. 5 shows a flowchart 100 having steps executable by the system of FIG. 1 and expanding upon the processes of FIG. 2 for allowing the performance attributes of a specific algorithm to be modified by a reviewing user. In a sense, the steps of the flowchart 100 overlap some processes discussed in the context of blocks 60-64 of FIG. 2.

Turning more particularly to the flowchart 100, block 102 shows the receipt of feedback, or user input 34, relating to the efficacy of a given, original algorithm 30 and/or performance attribute 32. This feedback may be pushed to the database and made part of the performance attributes 32 associated with the original algorithm 30.

At blocks 104 and 106 of FIG. 5, the computer system 10 may allow the user to receive and/or send an original algorithm 30 or modified algorithm/performance attribute 32 using electronic mail formatting and associated processes.

Block 108 shows that a user of an original algorithm 30 or associated performance attribute 32, e.g., a modified algorithm, may choose to submit a vote regarding the given algorithm 30 or performance attribute 32. If the user's feedback is positive at block 110, then the rating associated with an algorithm 30 and/or performance attribute 32 may be increased at block 112. As such, blocks 112 and 114 show that the feedback provided in blocks 108 and 110 may modify the quantitative efficiency attributes or other performance attribute 32. The quantitative efficiency attributes may therefore represent an aggregation of user feedback. For example, the more users of a given algorithm 30 or performance attribute 32 that submit positive feedback, the higher the quantitative efficiency attributes associated with that algorithm may be. Conversely, the more users of a given algorithm that submit negative feedback, the lower the quantitative efficiency attributes associated with that algorithm 30 and/or performance attribute 32.

More particularly, block 112 shows that if the feedback provided in blocks 108 and 110 is positive, the efficiency attributes that are quantitative may be increased. Block 112 also shows that each time an algorithm or part thereof is downloaded for use (as shown in blocks 116 and 118), the efficiency attributes that are quantitative may be increased. In the latter case, the quantitative efficiency attributes may be increased the more an algorithm is utilized. For purposes of this specification, an algorithm and performance attribute may comprise an entire or a portion of an algorithm.

Block 114 shows that if the feedback provided in blocks 108 and 110 is not positive, the efficiency attributes that are quantitative may be decreased.

Block 116 and 118 show that each time a given algorithm 30 or performance attribute 32 is downloaded for use by a user, the performance attribute 32 associated with frequency of use of the algorithm may be increased.

Block 120 shows that a user of a given algorithm 30 or performance attribute 32 may choose to provide descriptive or qualitative comments regarding the efficacy of a given algorithm or parts of a given algorithm.

Block 122 shows that the comments provided in block 120 may be stored in the memory 18 and associated with the given algorithm. The stored comments comprise part of the performance attributes 32 associated with the original algorithm 30 and make up the user feedback used to gauge the efficacy of the algorithm 30 or parts of the given algorithm.

Block 124 shows that users may search for algorithms 30 and/or performance attributes 32, and that the search criteria may include the content of the performance attributes 32 associated with the algorithm 30. Users may search for algorithms 30 and/or performance attributes 32 where the quantitative efficiency attributes meet criteria submitted by the users.

Block 126 shows that the algorithms 30 and/or performance attributes 32 matching the search criteria submitted in block 124 may be displayed to the querying user.

Aspects of the invention may embody multiple methods of providing a software developer with suitable algorithms. An embodiment may include the software developer affirmatively initiating the search and having algorithms returned that match the search criteria. Another embodiment may involve an IDE reviewing and analyzing the code being developed by the software developer, and suggesting algorithms in the memory 18 for use in alternative to what the software developer is drafting. In the latter case, the IDE may analyze the efficiency, categorization, code portions and other performance attributes 32 to determine which algorithms 30 and/or performance attributes 32 are suitable for recommendation to the software developer.

Embodiments consistent with the invention contemplate that the algorithms 30 stored in the memory 18 may be associated with an efficiency attribute automatically derived or calculated based on user input 34. The user input 34 may include feedback from users in the form of votes, or rankings, and may reflect the frequency of actual use of the algorithm. This efficiency attribute may be a summary, or measure, of the overall efficacy or popularity of the algorithm among the development community.

While the present invention has been illustrated by a description of various embodiments and while these embodiments have been described in considerable detail, it is not the intention of the Applicants to restrict, or, in any way limit the scope of the appended claims to such detail. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A method of developing an algorithm within an integrated development environment (IDE), the method comprising:
    displaying the algorithm, wherein the display includes a performance attribute associated with the algorithm, wherein the performance attribute provides an indication of a quality of the algorithm and categorizes the algorithm;
    enabling the algorithm to be downloaded and combined with a developing software program of a networked user of a plurality of networked users;
    receiving user input from the networked user relating to a usefulness of the algorithm in the combination with the developing software program;
    automatically modifying the performance attribute associated with the algorithm based on the user input;
    receiving a modified algorithm comprising modifications made to the algorithm by the networked user, wherein the user input includes a rating indicative of a process associated with the combining of the algorithm with the developing software program;
    enabling access to both the algorithm and the modified algorithm by the plurality of networked users; and
    displaying at least one of the modified performance attribute and a new performance attribute associated with the modified algorithm to the plurality of networked users.

2. The method of claim 1, further comprising receiving a query from a user interested in at least one of the algorithm and the modified algorithm.

3. The method of claim 2, further comprising locating the algorithm from among a plurality of algorithms by matching the performance attribute to a criterion of the user query.

4. The method of claim 2, further comprising locating the algorithm from among a plurality of algorithms by matching the performance attribute to a profile of the user submitting the user query.

5. The method of claim 2, further comprising displaying in response to the user query a second performance attribute associated with a second algorithm, wherein the second algorithm is related to the algorithm.

6. The method of claim 1, further comprising storing the performance attribute in association with the algorithm.

7. The method of claim 1, wherein automatically modifying the performance attribute further comprises integrating the user input to modify the performance attribute.

8. The method of claim 1, wherein automatically modifying the performance attribute of the algorithm further comprises modifying a performance attribute associated with the algorithm comprising at least one of a rating, a category, program language, and text.

9. The method of claim 1, wherein the performance attribute comprises a function of the algorithm.

10. The method of claim 1, wherein displaying the modified performance attribute to the plurality of networked users further comprises displaying the modified performance attribute in relation to another performance attribute according to a result of a comparison between the performance attributes.

11. The method of claim 1, further comprising a second performance attribute associated with a portion of the algorithm, wherein the second performance attribute provides an indication of a quality of the portion of the algorithm and categorizes the portion of the algorithm.

12. An apparatus including an integrated development environment (IDE), the apparatus comprising:

a memory storing the algorithm and an associated performance attribute, wherein the performance attribute provides an indication of a quality of the algorithm and categorizes the algorithm;

program code resident within the memory; and a processor in communication with the memory and configured to execute the program code to develop the algorithm, the processor being configured to display the algorithm and the associated performance attribute, to enable the algorithm to be downloaded and combined with a developing software program of a networked user of a plurality of networked users, to receive user input from the networked user relating to a usefulness of the algorithm in the combination with the developing software program, wherein the user input includes a rating indicative of a process associated with the combining of the algorithm with the developing software program, to automatically modify the performance attribute of the algorithm based on the user input, to receive a modified algorithm comprising modifications made to the algorithm by the networked user, to enable access to both the algorithm and the modified algorithm by the plurality of networked users, and to display at least one of the modified performance attribute and a new performance attribute associated with the modified algorithm to the plurality of networked users.

13. The apparatus of claim 12, wherein the processor is further configured to receive a query from a user interested in the algorithm.

14. The apparatus of claim 13, wherein the processor is further configured to locate the algorithm from among a plurality of algorithms in response to the user query.

15. The apparatus of claim 13, wherein the processor is further configured to locate the algorithm from among a plurality of algorithms by matching the performance attribute to at least one of a criterion of the user query and a profile of the user submitting the user query.

16. The apparatus of claim 13, wherein the processor is further configured to display in response to the user query a second performance attribute associated with a second algorithm, wherein the second algorithm is related to the algorithm.

17. The apparatus of claim 12, wherein the processor is further configured to integrate the user input to modify the performance attribute.

18. The apparatus of claim 12, wherein the performance attribute associated with the algorithm comprises at least one of a rating, a category, program language, and text.

19. The apparatus of claim 12, wherein the processor is further configured to display the modified performance attribute in relation to another performance attribute according to a result of a comparison between the performance attributes.

20. A program product to use in an integrated development environment (IDE), the program product comprising:

program code configured to display the algorithm, wherein the display includes a performance attribute associated with the algorithm, wherein the performance attribute provides an indication of a quality of the algorithm and categorizes the algorithm, to enable the algorithm to be downloaded and combined with a developing software program of a networked user of a plurality of networked users, to receive user input from the networked user relating to a usefulness of the algorithm in the combination with the developing software program, to modify the performance attribute associated with the algorithm based on the user input, to receive a modified algorithm comprising modifications made to the algorithm by the networked user, wherein the user input includes a rating indicative of a process associated with the combining of the algorithm with the developing software program, to enable access to both the algorithm and the modified algorithm by the plurality of networked users, and to display at least one of the modified performance attribute and a new performance attribute associated with the modified algorithm to the plurality of networked users; and a non-transitory computer readable medium bearing the program code.

* * * * *